Sept. 30, 1952  J. MAYNARD  2,612,337
VALVE
Filed May 31, 1946
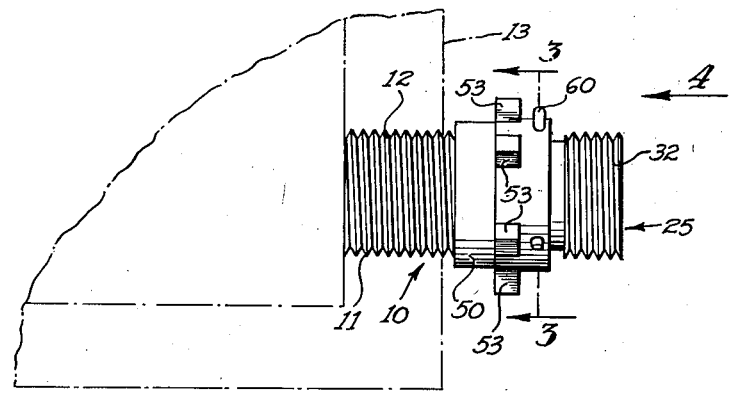
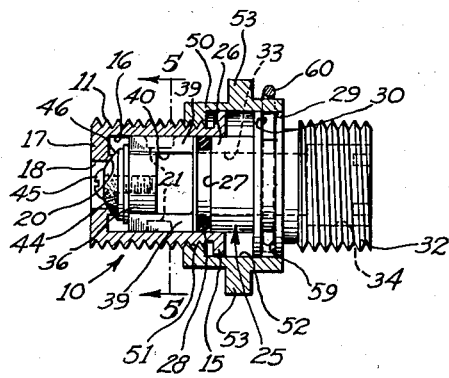
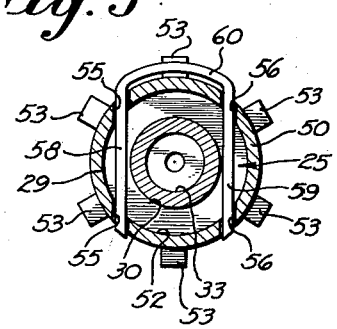
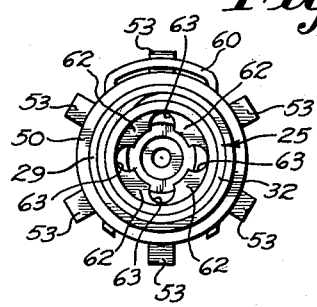
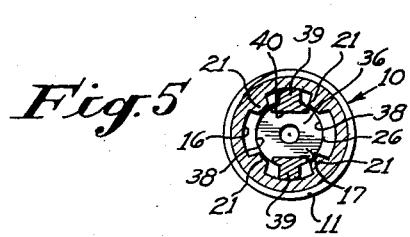
INVENTOR:
JAMES MAYNARD,
BY HIS ATTORNEYS
HARRIS, KIECH, FOSTER & HARRIS, Patented Sept. 30, 1952

2,612,337

UNITED STATES PATENT OFFICE 2,612,337

VALVE

James Maynard, Compton, Calif., assignor to Elgin Rowland Parker, Compton, Calif.

Application May 31, 1946, Serial No. 673,649

1 Claim. (Cl. 251—8)

My invention relates generally to valves and particularly to valves adapted for use in controlling the flow of liquids from tanks, vats, and other receptacles.

Valves are commonly employed as the means for controlling the flow of liquids from various types of receptacles and such valves have numerous faults which are well known. For example, faucets, spigots, cocks and other valves are provided with rotatable spindles which project outwardly from the valve body, usually at right angles to the flow of the liquid through the valve. Since clearance must be provided to permit rotation of the operating handle or wheel, such valves are made relatively large and project at a considerable distance from the receptacles to which they are applied and thus interfere with adjacent plumbing and other objects and are subject to breakage. It is one object of my invention to obviate this fault by providing a valve in which the spindle or valve member is disposed in the direction of flow of liquid so that the valve may be made relatively short in length and may occupy only slightly more space than an ordinary plug fitting.

In valves of previous types, the rotatable spindle carries a valve disc or washer which is engageable with a valve seat within the valve body and since the disc turns as it engages the seat it is subjected to considerable wear and must be replaced quite often. It is another object of my invention to provide a valve in which the spindle or valve member is non-rotatable so that the valve disc is moved axially into engagement with the valve seat without turning, thus eliminating friction therebetween and prolonging the service of the disc.

Another fault of prior valves is that their parts are held in assembled relation by nuts and other fastening means which require the use of wrenches or other tools in assembling and disassembling the parts and which must be carefully adjusted to effect ease of operation without binding of the parts. It is a further object of my invention to provide a valve in which the non-rotatable valve member is retained within the valve body by means of a detachable connecting member which may be readily applied and removed without the use of tools, thus facilitating assembling and disassembling of the parts and greatly simplifying the construction. The present valve thus may be conveniently disassembled to permit cleaning of its parts and replacement of the valve disc or washer.

Another object of my invention is to provide a valve which is composed of a minimum number of parts adapted for economical manufacture and assembly and one which is durable in use and requires less servicing than valves of previous types used for similar purposes.

Further objects of my invention will appear from the following specification and the drawing, which is intended for the purpose of illustration only, and in which:

Fig. 1 is a side elevational view of my improved valve, showing it applied to use with a tank or other receptacle;

Fig. 2 is a longitudinal part-sectional view of the valve device;

Fig. 3 is a cross-sectional view taken on the line 3—3 of Fig. 1;

Fig. 4 is an end view of the device, viewed in the direction of the arrow 4 in Fig. 1; and Fig. 5 is a cross-sectional view taken on the line 5—5 of Fig. 2.

My improved valve comprises, in general, a valve body member adapted to be screwed into the threaded outlet opening of a receptacle and provided with a bore formed with a valve seat, a valve member adapted to slide axially within the bore and provided with a valve disc engageable with the valve seat, said valve member being provided with a peripheral groove, interengaging means on the body member and valve member for preventing relative rotation therebetween, an actuating sleeve threaded onto the body member to adapt it to move axially thereof, and a detachable connecting member carried by the sleeve and engageable in the peripheral groove of said valve member, said connecting member being adapted, upon rotation of the actuating sleeve in one direction, to slide said valve member in a direction to cause its valve disc to engage the valve seat to close the valve and operative when said sleeve is rotated in the opposite direction to slide said valve member in a direction to disengage said valve disc from said valve seat to open the valve to permit flow of liquid from the receptacle.

Referring to the drawing in detail, the improved valve comprises a cylindrical body member 10 which is provided with helical threads 11 throughout the greater part of its length to adapt it to be screwed into the threaded outlet opening 12 of a receptacle or tank 13. At its outer end, that is, the end which projects outwardly from the receptacle 13, the body member 10 has a peripheral flange 15. The body member 10 is provided with an axial bore 16 and an end wall 17 at its inner end, the end wall being apertured to provide a valve orifice 18. The rim of the orifice 18 is machined to provide a conical valve seat 20. Referring to Figs. 2 and 5, the body member 10 has spaced ears or lugs 21 on its interior for a purpose to be explained hereinafter.

A substantially tubular valve member 25 is adapted to slide axially in the body member 10 to open and close the valve. The valve member 25 comprises a cylindrical stem portion 26 which is slightly smaller in diameter than the bore 16 to adapt it to slide axially therein. The stem portion 26 may have a peripheral groove 27 for receiving a sealing ring 28 which serves to prevent leakage of liquid between the stem portion and bore 16. The stem portion 26 projects outwardly beyond the outer flanged end of the body member 10 and is provided with a circumferential flange 29 which is recessed to form a peripheral groove 30. The valve member 25 has an outer axial extension 32 which is provided with external screw threads of standard size to adapt the end coupling of a hose (not shown) to be attached to the valve member when desired. The valve member 25 is provided with an axial bore 33 having a counterbored portion 34 at the outer end of the member. The bore 33 extends to a point adjacent the inner end of the stem portion 26, thus leaving an end wall 36. The inner end of the stem portion 26 is provided with arcuate recesses 38 in its periphery, thus forming a pair of radial projections 39 adapted to fit between the lugs 21 of the body member 10 to prevent relative rotation between the body member and the valve member 25 while permitting relative axial movement therebetween. The stem portion 26 is also provided with a transverse rectangular passage 40 which communicates with the bore 33. It will be apparent from the above that liquid entering the bore 16, by way of the opening 18, is adapted to flow through the recesses 38 and passage 40 into the bore 33 and to discharge through the open outer end of the valve member 25.

Secured to the inner end of the stem portion 26 of the valve member 25 is a valve disc or washer 44, preferably made from resilient material such as rubber. The disc 44 may be held in place by means of a screw 45 passing through a hole in the disc and screwed into a threaded hole in the end of the stem portion 26. The valve disc 44 may be provided with a conical face 46 adapted to engage against the valve seat 20 when the valve member 25 is slid inwardly to the position shown in Fig. 2.

An actuating sleeve 50 is provided with a threaded bore 51 to adapt the sleeve to be screwed onto the body member 10 and has a counterbore 52 of a diameter capable of receiving the flanges 15 and 29 of the body member 10 and valve member 25, respectively. Projecting radially from the periphery of the sleeve 50 are lugs 53 which constitute finger-pieces for facilitating rotation of the sleeve on the body member 10.

Drilled through the sleeve 50 at opposite sides of its axis are holes 55 and 56 (Fig. 3) adapted to receive the opposite legs 58 and 59 of a U-shaped connecting member 60. As will be apparent by reference to Fig. 2, the actuating sleeve 50 and valve member 25 are adapted to be adjusted axially with respect to each other to align the groove 30 with the holes 55 and 56, after which the legs 58 and 59 of the connecting member 60 may be inserted through the holes and groove to connect the sleeve and valve member for unitary axial movement while permitting relative rotation between the sleeve and valve member. The inherent resiliency of the legs 58 and 59 causes them to frictionally engage in the holes 55 and 56 to resist displacement of the connecting member 60.

With the parts of the valve device assembled in the relation shown in Fig. 2, the device is connected to the receptacle 13 by screwing the threaded portion of the body member 10 into the outlet opening 12 of the receptacle. To facilitate this attachment, I prefer to provide spaced radial projections 62 within the counterbore 34 of the valve member 25, the spaces 63 between the projections thus forming slots for receiving a screwdriver or other tool capable of rotating the valve member. The valve member 25 is keyed rotatively with the body member 10 by reason of the interengagement of the lugs 21 and projections 39 and thus rotation of the valve member 25 causes the body member 10 to be screwed into the outlet opening 12. It is to be noted that the need for providing the valve member with a wrench-engaging portion is avoided and thus the over-all length of the valve device is reduced to a minimum.

Assuming that the parts of the valve are in the relative positions shown in Fig. 2, that is, with the valve disc 44 in engagement with the valve seat 20, the valve will be closed and liquid within the receptacle 13 thus will be prevented from discharging through the orifice 18. When it is desired to remove liquid from the receptacle 13, the actuating sleeve 50 is rotated in counterclockwise direction, as viewed in Fig. 4 and since the engaging screw threads of the sleeve and body member 10 are of right-hand pitch the sleeve will move outwardly, movement of the sleeve in this direction being limited by the engagement of its inner threaded portion with the flange 15 of the body member. As the actuating sleeve 50 is rotated and moved axially outward the legs 58 and 59 of the connecting member 60 move circumferentially in the groove 30 and act to slide the valve member 25 outwardly.

As the valve member 25 is thus shifted to open position the valve disc 44 is disengaged from the valve seat 20 to permit liquid to flow through the orifice 18, the rate of flow of the liquid being dependent upon the degree of movement of the valve member. From the orifice 18, the liquid flows through the recesses 38 and opening 40 into the bore 33 of the valve member 25 and discharges through the outer open end of the valve member. If desired, a hose may be attached to the outer threaded end 32 of the valve member 25 for conducting the liquid to a remote location. While it is within the concept of this invention to form the valve member 25, with an angular spout, I prefer to provide the straight axial portion 32 since a valve having such an outlet end will occupy a minimum space and the valve will not detract from the appearance of a receptacle, such as a water heater tank.

When it is desired to shut the valve to stop the flow of liquid from the receptacle 13 the actuating sleeve 50 is turned in reverse direction and thus caused to move inwardly. Through the connecting member 60, the valve member 25 is shifted inwardly to engage the valve disc 44 with the valve seat 20 to disrupt the flow of liquid through the orifice 18.

It is to be particularly noted that the valve member 25 is prevented from rotating and thus the valve disc 44 is moved axially away from the seat 20. Through this provision wearing away or grooving of the valve disc, which is unavoidable when the disc is rotated, is prevented and thus the disc 44 will remain serviceable over a long period of time.

Another advantage of my improved valve resides in the fact that its parts may be conveniently and quickly disassembled without the use of wrenches or other tools when it is desired to renew the valve disc or to clean the interior of the valve. It is a well known fact that the internal parts of valves which are opened only occasionally are subject to corrosion and lime deposits are built up thereon, tending to reduce the size of the passage therethrough. It is therefore necessary to clean the interior of the valve and in the present improved valve this is accomplished by merely removing the connecting member by prying its cross-bar away from the sleeve 50 to withdraw the legs 58 and 59 from the holes 55 and 56 to uncouple the valve member 25 and actuating sleeve 50. The valve member 25 then may be withdrawn from the body member 10 and the valve disc 44 replaced by a new disc. The passages in the valve member 25 and the orifice 18 in the body member may then be cleaned, after which the parts may be re-assembled in the manner explained before. Thus, it will be seen that my valve may be readily assembled and disassembled without the use of tools and that the cleaning of the parts which are subject to the corrosive effects of liquids is greatly expedited.

My valve is of comparatively simple construction, being composed of a minimum number of parts adapted for economical manufacture and capable of being assembled without the use of tools. The parts of the valve may be made from brass or other corrosion-resistant material to render the valve operative over a long period of time.

Although I have shown the valve as embodied in a preferred form of construction, by way of example, it will be understood that it may be modified in various particulars without departing from the spirit of the invention. Consequently, I do not desire to be limited by the foregoing specifications, but desire to be afforded the full scope of the appended claim.

I claim as my invention:

A drain valve for use with a receptacle having a screw-threaded outlet opening, including: a body member having external screw threads extending throughout the major portion of its length by which said member can be screwed into said opening, said body member having a peripheral flange at its outer end and a bore provided with a valve seat; a tubular valve member slidable axially in said bore and having an end projecting forwardly from said outer end of said body member and provided with a pair of axially spaced, peripheral flanges defining between them a peripheral groove; interengaging means on said body member and said valve member for preventing relative rotation therebetween; an actuating sleeve having a bore and a reduced internally screw-threaded portion providing an internal annular shoulder, said peripheral flange of said body member being of larger diameter than said internally screw-threaded portion so that said sleeve can be screwed onto said body member only from the inner end thereof, said peripheral flanges of said valve member having a close fit in said bore of said sleeve, said peripheral flange of said body member providing a stop against which said shoulder engages to prevent withdrawal of said sleeve in an outward direction; and connecting means detachably mounted on said sleeve and engageable in said peripheral groove so that rotation of said sleeve in one direction causes sliding movement of said valve member in a direction to effect engagement thereof with said seat to close said valve and rotation of said sleeve in the opposite direction effects disengagement of said valve member from said seat so as to open said valve.

JAMES MAYNARD.

REFERENCES CITED

The following references are of record in the file of this patent:

UNITED STATES PATENTS

| Number | Name | Date |
|---|---|---|
| 163,263 | Schofield | May 11, 1875 |
| 289,075 | Davey | Nov. 27, 1883 |
| 1,070,100 | Barnes | Aug. 12, 1913 |
| 1,414,357 | Harris | May 2, 1922 |
| 1,779,750 | Oldham | Oct. 28, 1930 |
| 2,368,927 | Kiene | Feb. 6, 1945 |
| 2,412,330 | Glanz | Dec. 10, 1946 |

FOREIGN PATENTS

| Number | Country | Date |
|---|---|---|
| 60,365 | Germany | of 1891 |